UNITED STATES PATENT OFFICE 2,623,819

MEANS FOR IMPROVING ALKALINE CLAY SOILS AND METHOD OF MANUFACTURE

Carlo Paoloni and Alberto Eusepi, Turin, Italy

No Drawing. Application January 31, 1950, Serial No. 141,573. In Italy June 3, 1949

6 Claims. (Cl. 71—24)

Alkaline clay soils are unsuitable for cultivation, for they hinder normal development of vegetation, chiefly through their compact and waterproof structure. It is known to utilise the physical or chemical action of various means for transforming the nature of such soils in order to render them more or less porous and permeable. This is, however, very expensive and the result is uncertain.

The object of this invention is to provide inexpensive means for improving soil, more particularly alkaline clay soils.

A further object of this invention is to provide a soil improving means, which is adapted to exert on the soil a durable flocculating and fertilizing action.

A further object of this invention is to provide a cheaper method of manufacture of said soil improving means.

The soil improving means consists of dry finely subdivided peat containing ferric ammonium alum in a crystalline form. It has been found that this product, when uniformly distributed in the soil, exerts a durable flocculating action by reacting with clay containing colloids in the soil and transforming the characteristics of the latter, a fertilizing action being exerted at the same time by the ammonium salts and organic peat compounds.

We have further succeeded in preparing in a simple and inexpensive manner the said product on a commercial scale, the method comprising treatment of finely subdivided peat containing a normal percentage of moisture (about 70%) with ferric sulphate and ammonium sulphate, said two sulphates being employed in an anhydrous powdered condition and in such proportions as to form ferric ammonium alum. By thoroughly stirring together the said substances, the moisture in the peat dissolves the sulphates, forming ferric ammonium alum which then crystallizes, absorbing water of crystallization from the peat itself. The formation of these crystals thoroughly disintegrates the peat, for the crystals are mostly formed in the peat fibres and cause the latter to break by reason of the increase in volume.

The final product is crystalline and homogenous in appearance.

The product may be prepared for example as follows.

48 parts of ground fibrous peat containing 70% moisture are thoroughly mixed with 40 parts anhydrous powdered ferric sulphate and 12 parts anhydrous powdered ammonium sulphate. The reaction evolves heat and after a ripening period the product is in the form of a dry crystalline powder.

A considerable economic and commercial advantage of the above described method resides in the fact that the peat is employed in a natural condition without previous artificial drying, which would increase the cost of manufacture to a point prohibitive to the farmer.

The ammonium sulphate may be replaced in certain cases by anhydrous powdered potassium sulphate. In this case the latter sulphate is reacted with ferric sulphate and peat in equal percentages to form ferric potassium alum.

According to the kind of soil, the product is used in a proportion of 5 to 15 metric quintals (10 to 30 centiweights) by 10.000 sq. m. and treatment may be repeated at long intervals of time.

What we claim is:

1. A composition for improving alkaline clay soil which comprises ferric ammonium alum in crystalline form uniformly distributed in the fibers of disintegrated peat.

2. A method of preparing an alkaline clay soil improving composition comprising ferric ammonium alum in crystalline form uniformly distributed in the fibers of disintegrated peat which comprises treating disintegrated peat having its normal moisture content with anhydrous powdered ferric sulphate and anhydrous powdered ammonium sulphate, said sulphates being used in proportions to combine with the water contained in the peat to form the crystalline ferric ammonium alum.

3. A composition for improving alkaline clay soil which comprises a member of the group consisting of ferric ammonium alum and ferric potassium alum in crystalline form uniformly distributed in the fibers of disintegrated peat.

4. A method of preparing an alkaline clay soil improving composition comprising a member of the group consisting of ferric ammonium alum and ferric potassium alum in crystalline form uniformly distributed in the fibers of disintegrated peat which comprises treating disintegrated peat having its normal moisture content with anhydrous powdered ferric sulphate and a member of the group consisting of ammonium sulphate and potassium sulphate in anhydrous powdered form, said sulphates being used in proportions to combine with the water contained in the peat to form the crystaline alum.

5. A composition for improving alkaline clay soil which comprises ferric ammonium alum in crystalline form uniformly distributed in the fibers of disintegrated peat, said ferric alum being the predominant constituent of the composition.

6. A composition for improving alkaline clay soil which comprises a member of the group consisting of ferric ammonium alum and ferric potassium alum in crystalline form uniformly distributed in the fibers of disintegrated peat, said alum being the predominant constituent of the composition.

CARLO PAOLONI.
ALBERTO EUSEPI.

REFERENCES CITED

The following references are of record in the file of this patent:

UNITED STATES PATENTS

| Number | Name | Date |
|---|---|---|
| 1,974,877 | Schubert | Sept. 25, 1944 |

FOREIGN PATENTS

| Number | Country | Date |
|---|---|---|
| 10,996 | Great Britain | June 26, 1913 |
| 173,276 | Great Britain | Dec. 28, 1921 |